MAGNETIC TAPE MACHINE

Filed Aug. 21, 1957 5 Sheets-Sheet 1

INVENTOR.
Wm. A. Ellmore

BY Fisher and Swain

ATTORNEYS

Oct. 31, 1961 W. A. ELLMORE 3,006,650

MAGNETIC TAPE MACHINE

Filed Aug. 21, 1957 5 Sheets-Sheet 2

INVENTOR.
Wm. A. Ellmore

BY
Flehr & Swain
ATTORNEYS

MAGNETIC TAPE MACHINE

Filed Aug. 21, 1957 5 Sheets-Sheet 3

INVENTOR.
Wm. A. Ellmore

BY Flehr & Swain

ATTORNEYS

MAGNETIC TAPE MACHINE

Filed Aug. 21, 1957 5 Sheets-Sheet 4

INVENTOR.
Wm. A. Ellmore
BY
Flehr & Swain
ATTORNEYS

Oct. 31, 1961 W. A. ELLMORE 3,006,650

MAGNETIC TAPE MACHINE

Filed Aug. 21, 1957 5 Sheets-Sheet 5

INVENTOR.
Wm. A. Ellmore

BY
Flehr and Swain

ATTORNEYS

United States Patent Office 3,006,650 Patented Oct. 31, 1961

3,006,650

MAGNETIC TAPE MACHINE

William Austin Ellmore, Menlo Park, Calif., assignor to Ampex Corporation, Redwood City, Calif., a corporation of California Filed Aug. 21, 1957, Ser. No. 679,446
13 Claims. (Cl. 274—4)

This invention relates generally to machines employing magnetic tape and serving to record and/or playback sound and other recordable signals. It also pertains to devices for holding tape for use in such machines, and to magazines or other assemblies comprising both magnetic tape and tape holding means.

Conventional magnetic tape machines employ turntables serving to mount supply and takeup reels upon which the tape is wound. The operation of such machines involves withdrawing a length of tape from a supply reel, engaging the tape with the takeup reel, and then positioning the length of tape extending between the reels into proper relation with the magnetic transducer head and the tape driving capstan. This so-called "threading" operation involves considerable manual handling of the tape, which at times is objectionable. While threading is not difficult for the professional or more skilled users, it presents sufficient complication to handicap the sale of magnetic tape machines for home use. To eliminate threading operations, machines of the magazine type have been used which employ a tape of the endless loop type, or tape holding means incorporating both tape supply and takeup devices. Such machines have objectionable features which have prevented their wide application. The types of magazines employed have imposed limitation upon the length of the tape, and in the case of magazines holding an endless loop, a reverse rewind operation is difficult if not impossible. The tape guiding and driving means for use with such magazines is radically different from conventional designs, and as a result it is difficult to obtain high fidelity performance. Also such magazines cannot be used with magnetic recording and/or reproducing machines of the more conventional type, without radical alteration.

In general it is an object of the present invention to provide a magnetic tape machine which eliminates conventional manual tape threading operations.

Another object of the invention is to provide a machine of the above character which employs separate tape supply and receiving devices, and which makes possible both automatic threading and a rewind operation serving to place the tape back into the supply device.

Another object of the invention is to provide a machine of the above character which is characterized by the fact that the tape is driven in such a manner as to insure high fidelity performance.

Another object of the invention is to provide a novel tape holding device serving to hold a length of tape and an associated leader, and characterized in that when applied to my machine, simple rotation serves to effect automatic threading.

Another object is to provide a novel tape assembly comprising both tape holding means and a length of tape, and which is particularly adapted for use in a machine capable of automatic threading and rewind operations.

Additional objects and features of the invention will appear from the following description in which the preferred embodiments have been set forth in detail in conjunction with the accompanying drawing.

Referring to the drawing.

Figures 1, 2, 3:
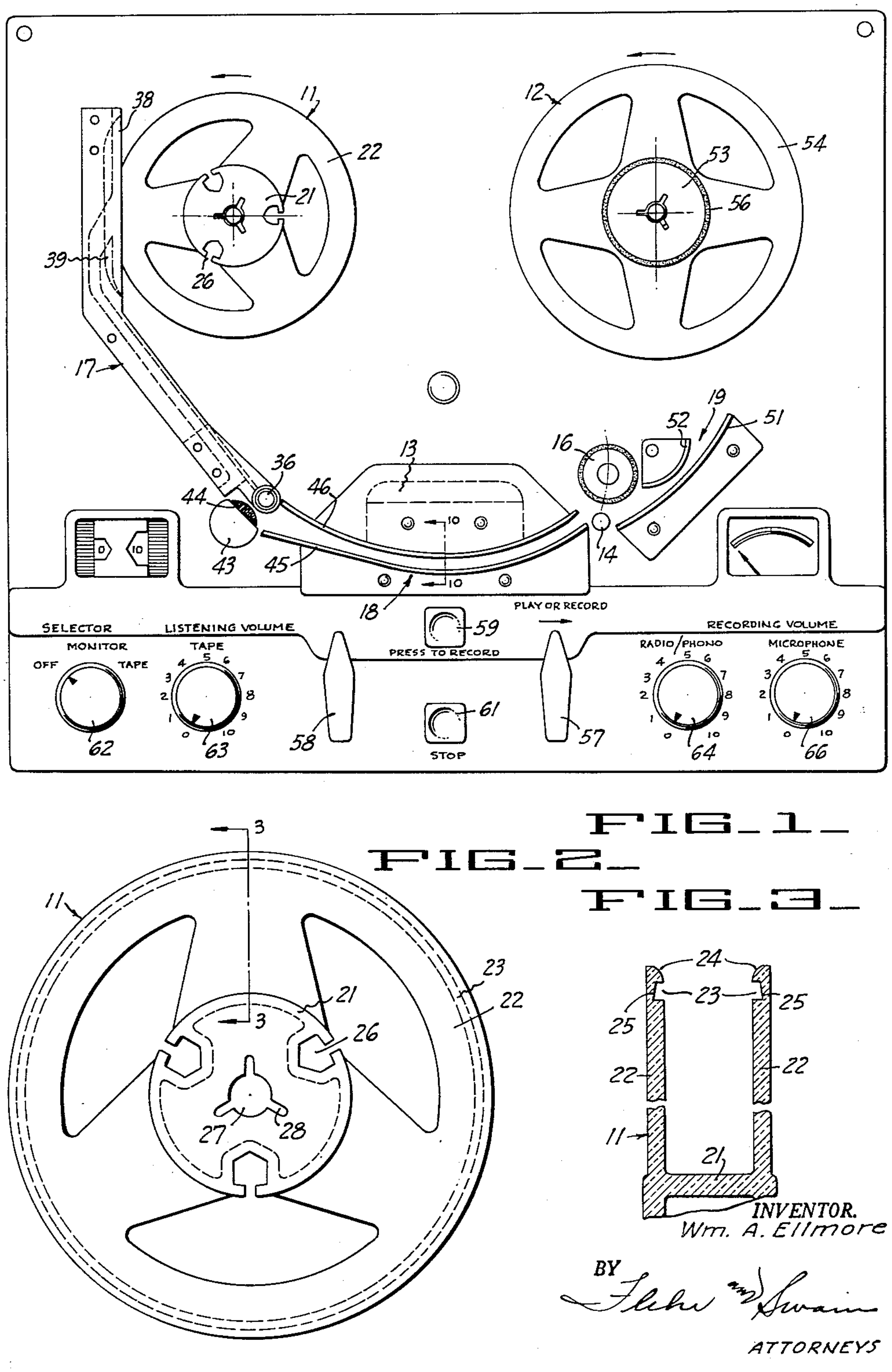
FIGURE 1 is a plan view illustrating a machine incorporating the present invention.
FIGURE 2 is a view showing tape holding means incorporating the present invention.
FIGURE 3 is a cross sectional detail taken along the line 3—3 of FIGURE 2, and on an enlarged scale.

The machine illustrated in FIGURE 1 consists of tape supply and receiving devices 11 and 12, removably carried by turntables of conventional construction. Suitable motive means, such as an electric motor (not shown), is associated with each turntable to obtain the desired operation characteristics to be presently explained. The machine also includes a transducer head 13, which may be of the magnetic type, and which in a typical instance consists of record, playback and erase units. For moving the tape at a constant speed past the head 13, I provide a driving capstan 14 and the clamping or pinch roller 16. The capstan is driven by a suitable motor (not shown), and the roller 16 is associated with suitable means (not shown) whereby it can be moved from the out of the way position shown in FIGURE 1, to a tape driving position in which it presses the tape against the periphery of the capstan 14. The machine also employs special guide means, including the means 17, 18, and 19, which are associated respectively with the supply device 11, the transducer head 13, and the driving capstan.

The tape supply device shown in FIGURES 2 and 3 is in the form of a tape reel, consisting of the central hub or core 21, and the side walls 22. These parts may be formed of suitable material, such as a molded plastic. The peripheral margins of the walls 22 are provided with oppositely faced annular grooves or recesses 23. Also the inner peripheral corners of the walls 22 are formed to provide the rounded surfaces 24, for engaging the edges of a tape leader as will be presently described. The walls 22 are slightly sprung whereby the recess surfaces 25 press against the edges of the leader. The slope of surfaces 25 tends to crowd the leader convolutions inwardly and in face to face contact. Aside from the features just described, the reel may have conventional details, as for example, slots 26 for engaging the ends of the tape, a central opening 27 for engaging the shaft of the turntable, and slots 28 for engaging a driving lug.

Figures 4, 5, 6, 10:
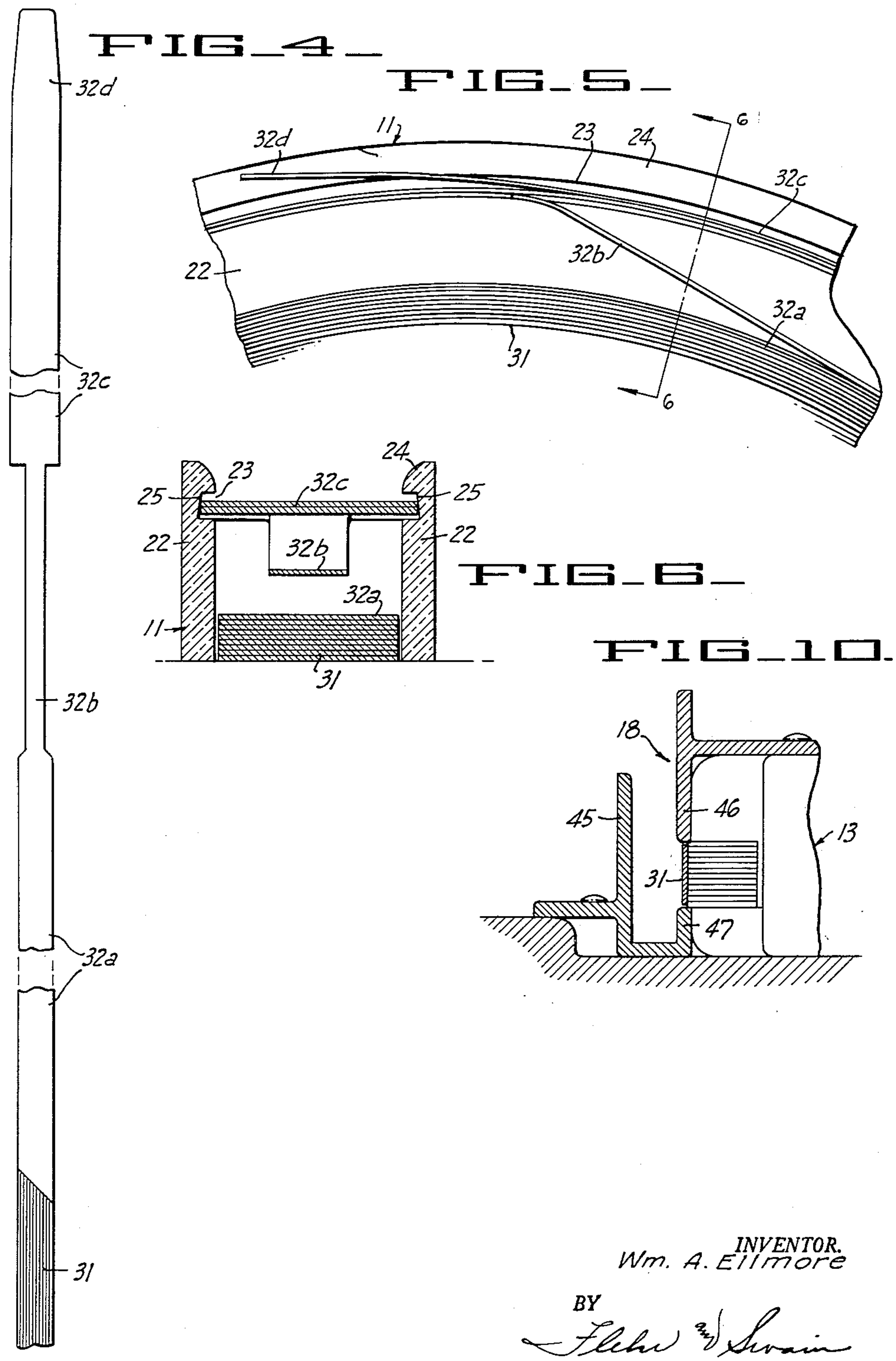
FIGURE 4 is a view showing the tape leader that is used in conjunction with the magnetic tape.
FIGURE 5 is an enlarged detail illustrating a portion of the reel of FIGURE 2, with tape applied to the same, and also showing the manner in which the leader is retained.
FIGURE 6 is a cross sectional detail taken along the line 6—6 of FIGURE 5.
FIGURE 10 is a cross sectional view on an enlarged scale taken along the line 10—10 of FIGURE 1.

FIGURE 4 shows a portion of the magnetic tape applied to the above described reel, and also the special leader attached to the end of the same. As is well known to those familiar with magnetic tapes, they consist of a relatively thin film of plastic material like cellulose acetate, provided on one side with a coating of a magnetic material. Due to the thinness and character of the plastic film, such a tape is relatively limp. In FIGURE 4 portion 31 represents one end of such limp tape. It is spliced to a leader comprising the several portions 32*a*, 32*b*, 32*c*, and 32*d*. This entire length of leader is formed of resilient material stiffer than the plastic film from which the tape is made, as for example, mylar having a thickness of the order of .0075 inch. Portion 32*a* is spliced to the end of the tape and has a width the same as that of the tape. Portion 32*b* is of reduced width. Portion 32*c* has a width somewhat greater than that of the tape. Portion 32*d* forms the tip end of the leader, and is tapered to a width substantially equal to the width of the tape. As will be presently explained in greater detail, the leader provides an extended length of greater stiffness. Portion 32*b* can be relatively short, as for example, of the order of 1 to 3 inches, and permits certain tape disengaging operations. Portion 32*c* should have a length more than sufficient to form a complete convolution when engaged with the reel recesses 23. The tip end portion 32*d* provides a tab for engaging strip off means as will be presently described.

FIGURES 5 and 6 illustrate the manner in which the tape and its leader are normally carried by the reel. The tape 31 is attached to and wrapped upon the hub 21 in the normal manner. Portion 32*c* of the leader has its edges accommodated within the grooves or recesses 23. The bottom walls 25 of the recesses are sloped as illustrated, whereby the recesses are of increasing depth toward the center of the reel. The portion 32*b* of the leader extends tangentially from the recesses 23 whereby its end terminates at a point spaced from the last leader convolution. If the portion 32*d* is engaged manually and pulled outwardly from the reel, the enlarged tape portion 32*c* is stripped from the recesses 23. This stripping occurs by virtue of outward springing of the side walls 22, together with some springing of the leader material.

In a typical instance the length of the wider leader portion 32*c* is such that two convolutions are engaged within the recesses 23. After these convolutions have been unwrapped and disengaged from the reel, the tape is free for unwrapping. When it is desired to re-engage the leader, it is simply urged progressively between the margins of the walls 22, whereby its edges snap into the recesses 23. When all of the leader is engaged in the manner illustrated in FIGURES 5 and 6, the friction between the wider portion of the leader and the side walls 22 is such that the leader can be forced against stripping means as will be presently described, to cause it to be unwound and stripped away from the reel.

Figures 7, 9:
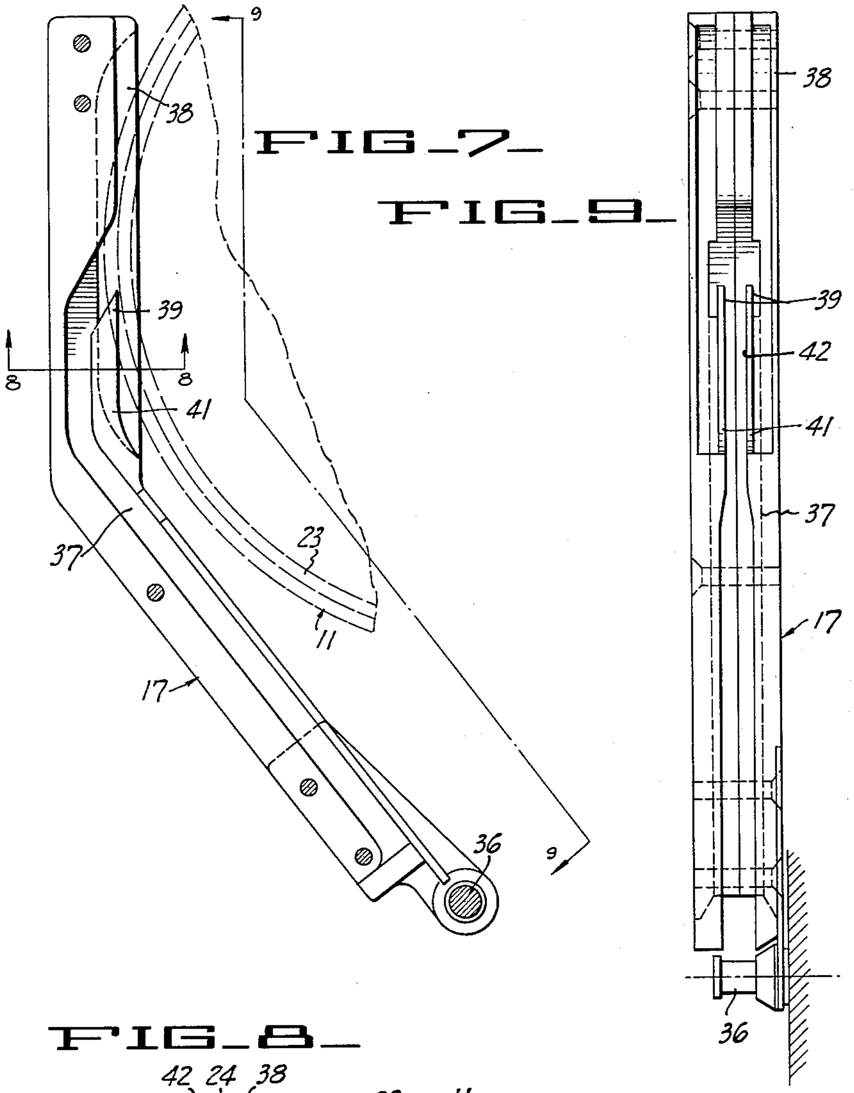
FIGURE 7 is a detail showing a portion of the guide means associated with the tape supply device.
FIGURE 9 is a view looking toward the right hand side of the guide means shown in FIGURE 7.
Figure 8:
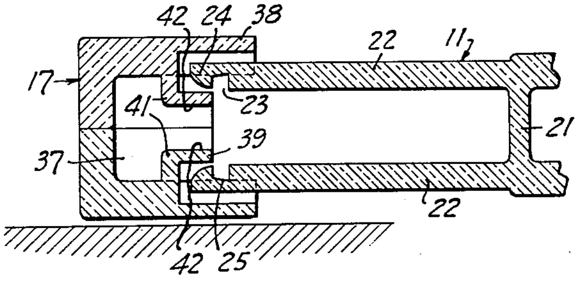
FIGURE 8 is an enlarged cross sectional detail taken along the line 8—8 of FIGURE 7.

The guide means 17 directly associated with the tape supply device 11 is shown in detail in FIGURES 7 and 8. For convenience, it is in the form of an arm having its one end carried by a pivot pin 36. By means of a spring (not shown) this arm is yieldably urged into cooperating relationship with the reel 11 as shown in FIGURE 7, although it may be manually retracted whereby it does not interfere with the removal or application of a reel. The interior of the arm is provided with a guide channel 37, which is dimensioned to pass the leader. Adjacent the reel, the arm is provided with flanges 38, having a spacing somewhat greater than the overall thickness of the reel, whereby a peripheral portion of the reel may normally occupy the space between these flanges, as shown in FIGURES 7 and 8. This portion of the arm also carries the stripping spurs 39, which are spaced apart a distance slightly less than the width of the tape, and which are dimensioned and positioned to be accommodated within the peripheral margins of the reel. It will be evident from FIGURE 7 that when the tip of the leader is engaged by spurs 39, while the reel is being rotated in a counterclockwise direction, the leader is stripped from the reel and caused (by virtue of its resilience and stiffness) to pass through the guide channel 37. The inner side of the channel 37 is defined by portions 41 which are dimensioned to provide the open slot 42. This slot is dimensioned to be less than the width of leader portion 32*c* but it will pass the reduced leader portion 32*b*. Adjacent the pivot pin 36 I can provide a guide stud 43 which is shown provided with a tape engaging surface 44 formed of yieldable material such as felt.

The guide means 18 serves to guide the tape leader past the transducer head 13. As illustrated it consists of a curved guide strip 46 extending from the region of the guide stud 43 to the capstan 14. Additional curved strips 47 are spaced from strip 46, and extend generally parallel thereto. Strips 47 are spaced apart (FIGURE 10) a distance slightly greater than the width of the magnetic tape, thus permitting the magnetic tape to engage the units of the transducer head. However, this spacing is less than the width of the wider portion 32*c* of the leader.

The guide means 19 consists of the spaced curved walls 51 and 52 interposed between the capstan 14 and the tape receiving means 12.

The tape receiving means 12 can consist of an open sided reel, including the hub 53 and side wall 54. The hub is provided with a surfacing 56 having a high coefficient of friction, such as rubber or a pressure sensitive adhesive.

In accordance with known practice, the motors serving to drive the turntables, and the motor for the capstan, are connected to suitable circuitry controlled for various operating conditions. The control is such that after an operator places a reel 11 upon the lefthand turntable, the motors for the two turntables can be energized whereby they both rotate in a counterclockwise direction. Also the arrangement is such that pinch roller 16 can be caused to press against the capstan 14 for driving the leader, after the leader has been positioned in driving relation with the capstan. In addition the circuitry can be controlled to reverse the rotation of the motors, for rewind operations. It will be apparent that a variety of control members can be used to obtain the operations just described. For example, knob 57 can be turned to energize the turntable motors for threading, record and/or playback operations. Knob 58 can be turned for a rewind operation, in which event the turntable motors are energized to wind the tape back upon the reel 11. Buttons 59 and 61 are for record and stop operations. Selector 62 can be used for monitoring, and knob 63 to control the monitoring volume. Knob 64 may switch from radio to phonograph, and knob 66 can select a particular microphone circuit.

Figures 11, 12, 13, 14, 15, 16:
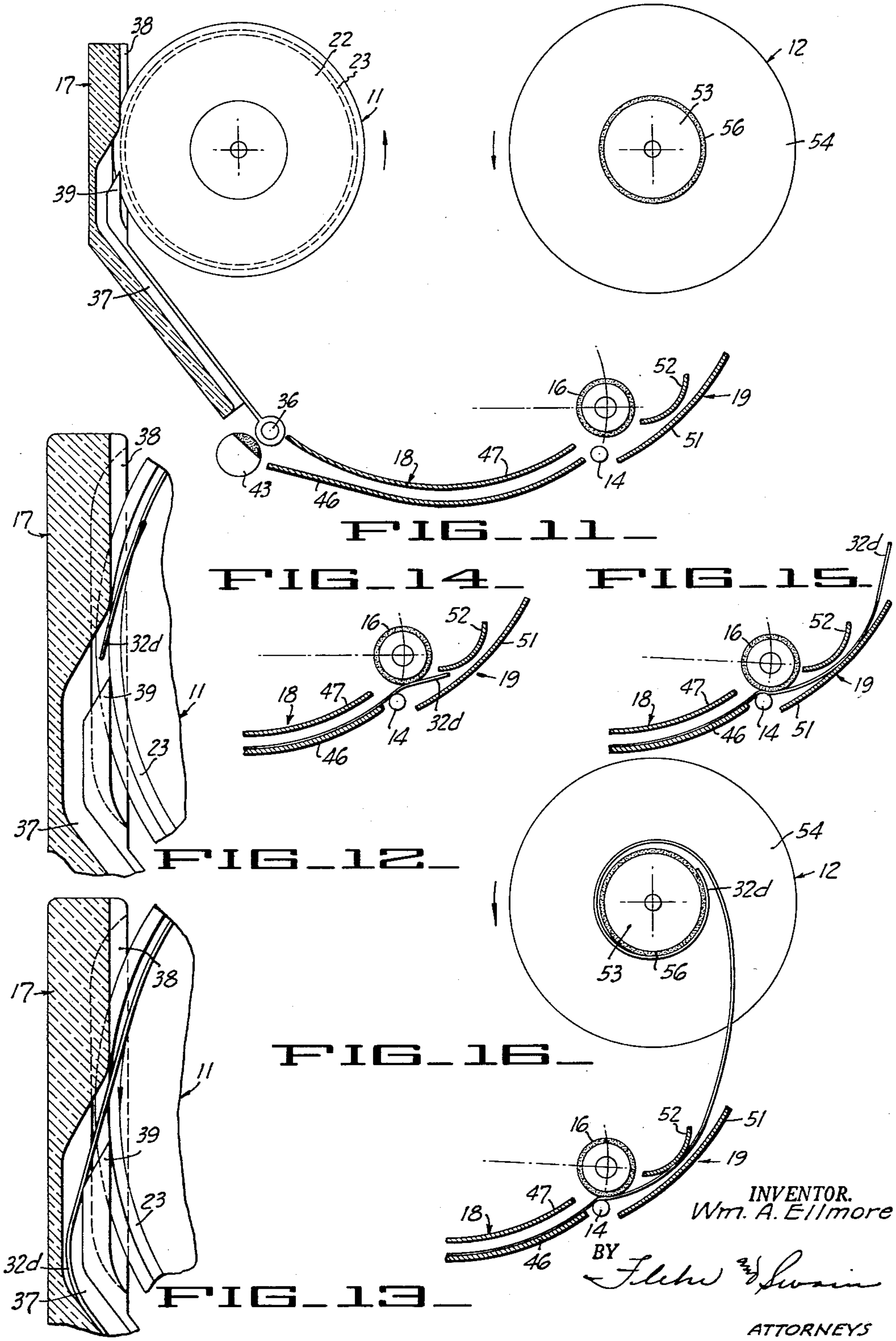
FIGURE 11 is a plan view like FIGURE 1 but showing the parts schematically.
FIGURE 12 is a schematic detail illustrating the manner in which the tape leader is presented to the stripping means.
FIGURE 13 is a view like FIGURE 12 but showing the leader being stripped from the reel.
FIGURE 14 is a schematic detail illustrating the manner in which the leader is presented for engagement by the driving capstan.
FIGURE 15 is a schematic view illustrating the manner in which the tape leader is engaged by the driving capstan and advanced toward the tape takeup means.
FIGURE 16 is a view showing the tape receiving or takeup means, and the manner in which the tape leader engages the same.
Figure 17:
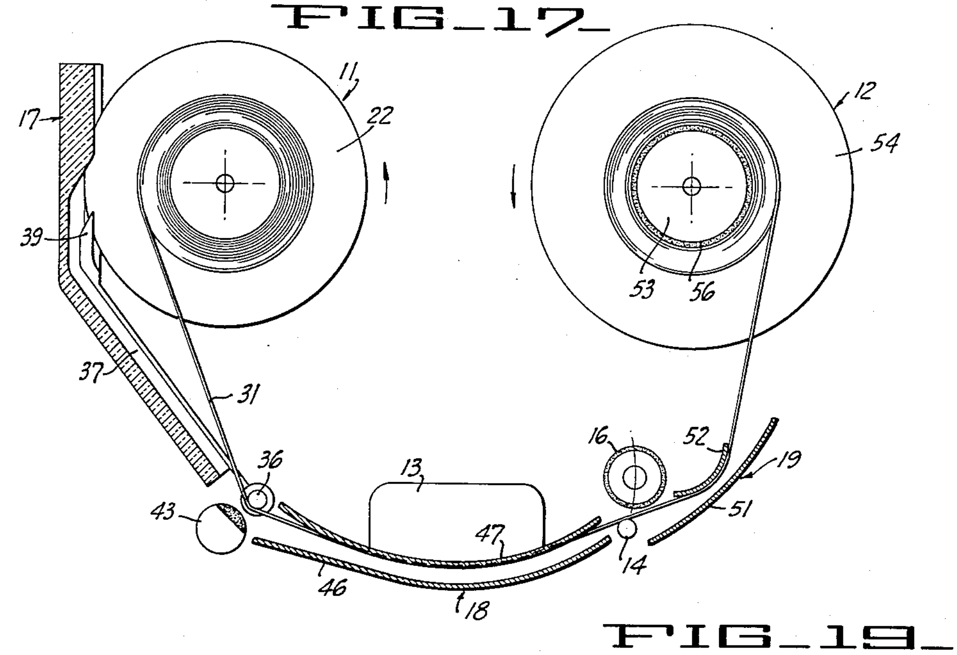
FIGURE 17 is a view like FIGURE 11 but showing the tape fully threaded and in engagement with the transducer head.

Operation of my machine can best be understood by a reference to FIGURES 11–16. In FIGURE 11 it is assumed that reel 11 contains tape with a leader as previously described. Assuming that one wishes to proceed with a recording or playback operation, the turntable motors are energized whereby reels 11 and 12 are rotated in a counterclockwise direction as illustrated.

The projecting leader tip 32*d* is brought into proximity with the stripping spurs 39 as shown in FIGURE 12, whereby further rotation of the reel 11 in a counterclockwise direction causes the leader to be stripped from the reel as shown in FIGURE 13. The stripped off part of the leader progresses through the guide channel 37, and through the guide means 18, until the advancing end of the leader progresses between the capstan 14 and the pinch roller 16. At that time a length of leader has been stripped from the reel such that only a short remaining portion of the wide portion **32*c* remains engaged in the recesses 23. Either by manual or automatic control the pinch roller 16 is moved into clamping engagement against the capstan 14, whereby the leader now advances through the guide means 19 toward the hub 53 of the reel 12. This portion of the leader (but not the portion 32*c*) is provided with a preset, whereby it normally tends to assume the form of a spiral having a diameter substantially the same as the diameter of the hub 53. Therefore the advancing end of the leader tends to wrap itself about the hub 53, in the manner shown in FIGURE 16. When about one or more convolutions of the leader have thus been wrapped about the hub 53, there is a snubbing effect tending to tighten the convolutions about the friction surface 56**, whereby in effect an engagement is formed between the leader and the hub to cause the leader and then the tape to be wrapped upon the hub.

During the threading operations just described the stud 43 preferably occupies a position as substantially shown in FIGURE 1. However, when the clamp roller 16 is engaged with capstan 14, motive means can be provided for advancing the stud 43 toward the pin 36, thus tending to apply some friction to the tape whereby the tape is maintained under proper tension as it is drawn across the units of the head 13.

As the last of the widened portion **32*c* of the leader is stripped from the reel 11, the narrow leader portion 32*b* passes between the stripping spurs 39, and also through the slot 42 of the guide means 17. Likewise the following tape passes between the guide strips 47, for engagement with the operating units of the transducer head. Thus during normal record and/or playback operations, the tape is completely disengaged with respect to the guide means 17, and the tape extends directly from the reel 11 to the guide pin 36**.

Assuming now that one desires to wind the tape back upon the reel 11, the motors for the turntables are energized for reverse rotation, but with suitable braking or reverse torque being applied to the righthand turntable to maintain an optimum amount of tape tension. When the end of the tape leaves the reel 12, the leader commences to unwind, and as the wider leader portion **32*c* enters guide means 18, it is automatically positioned between the strips 46 and 47, or in other words the leader is retracted from direct contact with the transducer head units. Similarly the widened portion of the leader is automatically caused to pass through the guide duct 37 of the guide means 17. As the widened leader portion commences to wind back upon the reel, its edges are caused to be re-engaged within the recesses 23 in the manner previously described, until all of the leader has been repositioned in the manner illustrated in FIGURES 5 and 6. Thereafter the guide means 17 can be retracted and the reel 11** removed from the turntable.

It will be evident from the foregoing that I have provided a magnetic tape machine which obviates the customary manual threading. Threading of the tape occurs automatically, and the tape is automatically engaged with the tape receiving means. Likewise the tape is automatically repositioned back upon the supply reel without handling. The supply reel in effect forms a tape magazine assembly, which retains the tape leader in such a manner that it is always ready for cooperation with the other elements of the machine. During periods when a particular reel assembly is not in use on the machine, the leader protects the tape and prevents it from becoming unwound. Although such a reel assembly is intended for use with a machine having automatic threading features as described above, it can be used on conventional magnetic tape record and/or playback machines of the type provided with two turntables for receiving supply and takeup reels. Also the machine can be used with conventional tapes that are not provided with a special leader.

Figure 18:
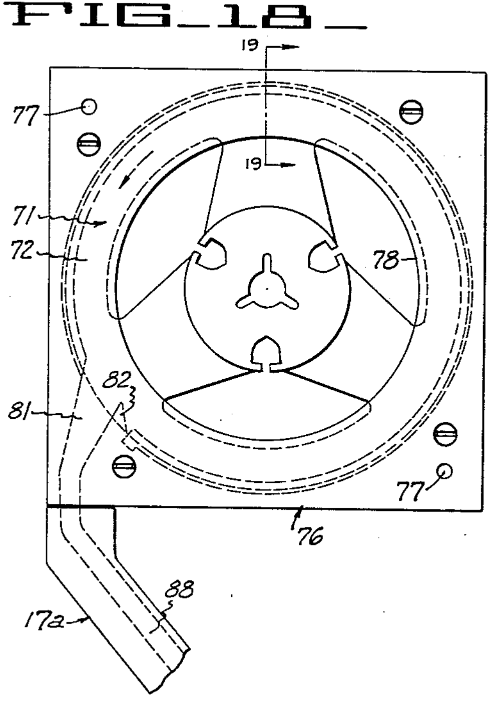
FIGURE 18 is a plan view illustrating a modified type of tape magazine.
Figure 19:
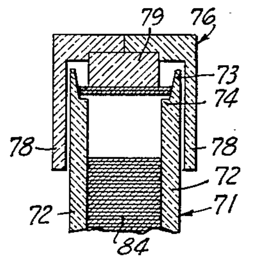
FIGURE 19 is an enlarged cross sectional view taken along the line 19—19 of FIGURE 18.
Figure 20:
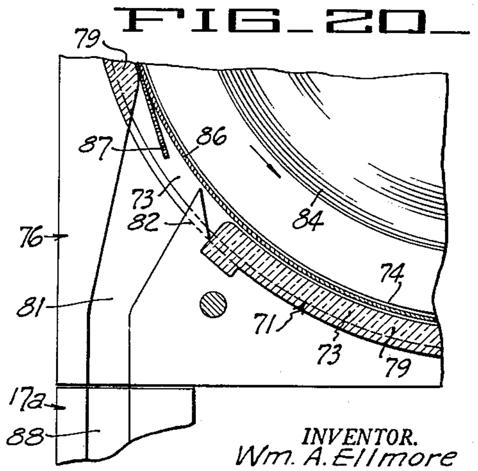
FIGURE 20 is a detail partly in section illustrating the construction of the magazine shown in FIGURE 18.

The modified magazine illustrated in FIGURES 18–20 makes use of a housing together with a reel. The reel 71 in this instance is similar to the reel illustrated in FIGURES 2 and 3, except that instead of the annular grooves or recesses 23, the outer peripheral edges of the reel sidewalls 72 are provided with beveled or sloped opposed surfaces 73, which at their inner edges terminate at the peripheral shoulders 74. The reel is loosely enclosed by a housing 76, capable of being seated upon the top panel of the recorder, and centered with respect to the associated turntable, by means such as the locating or positioning pins 77. The spaced annular flanges 78 (FIGURE 19) loosely accommodate and retain the peripheral margin of the reel. A split ring 79 is seated within the housing and located between the sloped surfaces 73. One portion of the reel is provided with a passage 81, through which the tape is adapted to pass, and adjacent one side of this passage, the housing is provided with a spur 82, which likewise extends between the reel surfaces 73. The tape 84 in this instance has a stiffer leader 86 spliced to the same, and this leader has a portion formed to a width somewhat greater than that of the tape. Normally the leader is dimensioned whereby its edges press against the inclined surfaces 73 of the reel, whereby the sidewalls 72 of the reel are slightly sprung away from each other. The leader is held in such position by the split ring 79. This ring is anchored to prevent its rotation together with the reel, and it is sprung whereby it tends to yieldably press against the outer convolution of the leader. The tip end 87 of the leader is spaced somewhat from the last leader convolution as shown in FIGURE 20. While the leader has a portion wider than that of the tape, it may not in this instance have a portion narrower than that of the tape.

The machine with which the above magazine can be used may be the same machine as previously described, except for modification of the guide means 17. Thus as illustrated in FIGURE 20, the guide means **17*a* is simplified by omitting the spurs 39, and merely has a passage 88 for receiving the leader and the attached tape. The tape normally occupies the passage 88** during operation of the machine.

Operation of the magazine shown in FIGURES 18–20 is as follows: Assuming that the reel 71 is turned in a counterclockwise direction after being placed upon the machine with the reel in driving relation with the turntable, the tip 87 of the leader engages the spur 82, with the result that the leader is stripped away from the reel and extended through the passages 81 and 88. Eventually the leader has been extended sufficiently far for engagment with the driving capstan. Upon winding the tape back upon the reel, the leader is repositioned between the surfaces 73, where it is retained in readiness for another playing operation.

I claim:

1. In a magnetic tape machine, means for mounting tape supply and takeup devices, said tape supply device being in the form of a reel adapted to be rotated for supplying a length of magnetic tape and being adapted to store a length of wrapped pliable magnetic tape having a leader attached to the outer end of the same, the leader being stiffer than the tape and having a length of the order hereinafter specified, a transducing head adapted to cooperate with the tape for recording and/or reproducing operations, capstan driving means for engaging the leader and the tape and serving to pull the tape past the transducer head, the leader having a length greater than the distance between the supply device and the capstan means, and leader guide means extending from said tape supply device to the capstan means for guiding the leader from the tape supply device to the capstan means responsive to unwinding the leader from the supply device.

2. A machine as in claim 1 together with means for stripping the leader from the supply device as the leader is unwound from the supply device.

3. In a magnetic tape machine, means for mounting tape supply and the takeup device, said tape supply device being in the form of a reel adapted to be rotated for supplying a length of magnetic tape and being adapted to store a length of wrapped pliable magnetic tape having a leader attached to the outer end of the same that is stiffer than the tape, a transducing head adapted to cooperate with the tape for recording and/or reproducing operations, capstan driving means for engaging the leader and the tape and serving to pull the tape past the transducing head, means for stripping the leader from the supply device as the leader is unwound from the same, and leader guide means extending from said stripping means, past the transducing head and to the capstan means for guiding the leader from the tape supply device to the capstan means responsive to unwinding of the leader from the supply device, said guide means being in the form of a channel defined by spaced wall portions, the wall portion facing the transducer head having a slot extending longitudinally of the same, the slot having a width less than the width of the tape, whereby when a leader with a narrow portion of reduced width is progressed through said guide means and engaged by the capstan means, the narrow portion of the same is caused to leave the guide means and direct the tape directly past the transducer head and to the capstan means, exterior of said guide means.

4. A machine as in claim 3 together with means for stripping the leader from the supply means and for directing the same into said guide means.

5. A magnetic tape holding device adapted to hold a length of magnetic tape wrapped spirally upon itself together with a stiffer resilient leader attached to and extending from one end of the tape, the leader having a portion substantially wider than the normal tape width, said device comprising a space in which the tape can be wound, and means surrounding said space for receiving and releasably retaining the wider portion of the leader in a wrapped condition, said last named means being at least as wide as said magnetic tape at all times.

6. A magnetic tape holding device as in claim 5 in which said last means comprises detent means for releasably retaining the wider portion of the leader.

7. A magnetic tape holding device as in claim 6 in which said detent means comprises opposed annular grooves adapted to accommodate the edges of said wider portion of the leader.

8. A tape holding device as in claim 5 in which said last named means comprises sloped opposed surfaces on the outer margins of sidewalls forming a part of the reel, and means for retaining convolutions of the leader in frictional engagement with said surfaces.

9. A magnetic tape assembly comprising a length of magnetic tape having a stiffer resilient leader attached to and extending from one end into the same, the leader having a portion wider than the tape, tape holding means having a space in which the length of tape can be wound, and means surrounding such space for releasably retaining said portion of the leader in a wrapped condition, said last named means being at least as wide as said magnetic tape at all times.

10. A magnetic tape assembly as in claim 9 in which said last means comprises detent means for releasably retaining the wider portion of the leader.

11. A magnetic tape assembly as in claim 9 in which the tape holding means is a reel and in which said last means comprises sloped opposed surfaces on the outer margins of the sidewalls of the reel, and means for retaining convolutions of the leader in frictional engagement with said surfaces.

12. A magnetic tape assembly as in claim 10 in which the tip end of the elader is of reduced width, said detent means serving to releasably engage and retain the wider portion of the leader and permitting the tip end of the leader to extend tangentially from the leader convolutions.

13. A magnetic tape holding device adapted to hold a length of magnetic tape wrapped spirally upon itself together with a stiffer resilient leader attached to and extending from one end of the tape, the leader having a portion substantially wider than the normal tape width, said device comprising a reel having a space in which the tape can be wound, said reel including sidewalls between which the convolutions of the tape are wound, a housing loosely retained upon the reel, the reel having its peripheral portions adapted to receive and frictionally engage the edges of the leader, means carried by the housing for retaining said convolutions of the leader in frictional engagement with said reel, and means carried by the housing for stripping the leader from the reel responsive to rotation of the reel relative to the housing.

References Cited in the file of this patent

UNITED STATES PATENTS

| | | |
|---|---|---|
| 1,225,184 | Segel | May 8, 1917 |
| 1,253,372 | Gotti | June 15, 1918 |
| 1,300,974 | Johannsen | Apr. 15, 1919 |
| 1,391,372 | Connell | Sept. 20, 1921 |
| 1,623,514 | Wittel | Apr. 5, 1927 |
| 1,867,488 | Barr | July 12, 1932 |
| 2,203,655 | Lechleitner et al. | June 4, 1940 |
| 2,503,453 | Pratt et al. | Apr. 11, 1950 |
| 2,529,501 | Johnston | Nov. 14, 1950 |
| 2,585,226 | Christman | Feb. 12, 1952 |
| 2,790,643 | Gedde et al. | Apr. 30, 1957 |

UNITED STATES PATENT OFFICE

CERTIFICATE OF CORRECTION

Patent No. 3,006,650 October 31, 1961

William Austin Ellmore

It is hereby certified that error appears in the above numbered patent requiring correction and that the said Letters Patent should read as corrected below.

Column 5, line 49, after "optimum" insert -- minimum --; column 8, line 23, for "elader" read -- leader --.

Signed and sealed this 19th day of June 1962.

(SEAL)
Attest:

ERNEST W. SWIDER
Attesting Officer

DAVID L. LADD
Commissioner of Patents